(12) United States Patent
Eckstein et al.

(10) Patent No.: US 7,861,367 B2
(45) Date of Patent: Jan. 4, 2011

(54) VACUUM CLEANER

(75) Inventors: Daniel Eckstein, Winnenden-Baach (DE); Thorsten Langen, Stuttgart (DE); Martin Wegner, Fellbach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 57 days.

(21) Appl. No.: 12/321,965

(22) Filed: Jan. 26, 2009

(65) Prior Publication Data

US 2009/0205158 A1    Aug. 20, 2009

Related U.S. Application Data

(63) Continuation of application No. PCT/EP2006/007542, filed on Jul. 29, 2006.

(51) Int. Cl.
*A47L 9/16* (2006.01)
(52) U.S. Cl. ....................................... 15/353
(58) Field of Classification Search .................. 15/353, 15/319, 352; A47L 9/16, 9/20
See application file for complete search history.

(56) References Cited

U.S. PATENT DOCUMENTS

| | | | |
|---|---|---|---|
| 2,591,567 | A | 4/1952 | Lofgren et al. |
| 3,509,394 | A | 4/1970 | Heidtmann |
| 3,748,836 | A | 7/1973 | Bachle |
| 3,994,067 | A | 11/1976 | Hazzard et al. |
| 4,033,732 | A | 7/1977 | Axelsson et al. |
| 4,124,915 | A | 11/1978 | Schlicher |
| 4,124,916 | A | 11/1978 | Fromknecht |
| 4,171,208 | A | 10/1979 | Lowder |
| 4,277,265 | A | 7/1981 | Leinfelt |
| 4,329,161 | A | 5/1982 | Osborn |
| RE31,417 | E | 10/1983 | Huber |
| 4,482,129 | A | 11/1984 | Baker et al. |
| 4,581,135 | A | 4/1986 | Gerulis |

(Continued)

FOREIGN PATENT DOCUMENTS

DE    210 658    6/1909

(Continued)

*Primary Examiner*—David A Redding
(74) *Attorney, Agent, or Firm*—Lipsitz & McAllister, LLC

(57) ABSTRACT

The invention relates to a vacuum cleaner with a dirt collection tank which has a suction inlet and is in flow connection with at least one suction unit via at least one filter and at least one extraction line, and with at least one external air inlet which opens into the extraction line downstream of the filter and can be closed by means of at least one closing valve, wherein the closing valve has a movable valve member which is acted upon by a spring-elastic restoring device with a closing force and in the closing position, in addition, by a magnetic holding device with a magnetic holding force. In order to develop the vacuum cleaner further in such a manner that it makes a particularly effective cleaning of the filter possible, it is suggested in accordance with the invention that the magnetic holding device have an electromagnet which can be acted upon with an exciting current for the purpose of closing the closing valve and that the valve member can be moved continuously back into the closing position via the open position, proceeding from the closing position, when the exciting current is interrupted, wherein the switch-off time of the exciting current is adapted to the movement time of the valve member.

15 Claims, 4 Drawing Sheets

U.S. PATENT DOCUMENTS

| | | | |
|---|---|---|---|
| 4,719,662 A | 1/1988 | Horak et al. |
| 4,733,326 A | 3/1988 | Harsch et al. |
| 4,921,510 A | 5/1990 | Plooy |
| 5,002,594 A | 3/1991 | Merritt |
| 5,178,652 A | 1/1993 | Hüttlin |
| 5,246,205 A | 9/1993 | Gillingham et al. |
| 5,368,060 A | 11/1994 | Worrall et al. |
| 5,882,180 A | 3/1999 | Kawaguchi et al. |
| 5,975,062 A | 11/1999 | Bonse et al. |
| 6,406,505 B1 | 6/2002 | Oh et al. |
| 6,458,178 B1 | 10/2002 | Dietz et al. |
| 6,517,325 B2 | 2/2003 | Tsuru et al. |
| 6,640,385 B2 | 11/2003 | Oh et al. |
| 6,782,583 B2 | 8/2004 | Oh |
| 6,936,161 B2 | 8/2005 | Wright et al. |
| 7,340,797 B2 | 3/2008 | Theiss, Jr. et al. |
| 7,647,672 B2 | 1/2010 | Nam et al. |
| 2002/0066262 A1 | 6/2002 | Oh |
| 2002/0088078 A1 | 7/2002 | Oh et al. |
| 2002/0124729 A1 | 9/2002 | Dudley |
| 2003/0167590 A1 | 9/2003 | Oh |
| 2005/0011036 A1 | 1/2005 | McCutchen |
| 2005/0254270 A1 | 11/2005 | Melchert et al. |
| 2008/0086835 A1 | 4/2008 | Stewen et al. |
| 2008/0092498 A1 | 4/2008 | Stewen et al. |
| 2009/0027823 A1 | 1/2009 | Follic et al. |

FOREIGN PATENT DOCUMENTS

| | | |
|---|---|---|
| DE | 1 800 480 | 6/1970 |
| DE | 2 106 058 | 9/1971 |
| DE | 91 04 127 | 7/1991 |
| DE | 41 38 223 | 2/1993 |
| DE | 298 23 411 | 5/1999 |
| DE | 199 49 095 | 4/2001 |
| DE | 200 10 608 | 12/2001 |
| DE | 100 56 935 | 2/2002 |
| DE | 101 40 351 | 6/2002 |
| DE | 101 01 219 | 7/2002 |
| DE | 101 50 257 | 7/2002 |
| DE | 102 40 618 | 9/2003 |
| DE | 10 2005 029 606 | 1/2006 |
| DE | 10 2004 056 076 | 5/2006 |
| DE | 10 2005 017 568 | 10/2006 |
| DE | 10 2005 017 702 | 12/2006 |
| DE | 10 2005 035 884 | 2/2007 |
| EP | 0 289 987 | 11/1988 |
| EP | 0 955 003 | 11/1999 |
| EP | 1 166 705 | 1/2002 |
| EP | 1 656 872 | 5/2006 |
| GB | 956764 | 4/1964 |
| GB | 2 337 922 | 12/1999 |
| JP | 08038401 | 2/1996 |
| JP | 2002028107 | 1/2002 |
| JP | 2006181228 | 7/2006 |
| WO | 95/10972 | 4/1995 |
| WO | 95/27431 | 10/1995 |
| WO | 97/19630 | 6/1997 |
| WO | 01/74493 | 10/2001 |
| WO | 2004/100752 | 11/2004 |
| WO | 2008/014794 | 2/2008 |
| WO | 2008/014796 | 2/2008 |
| WO | 2008/014797 | 2/2008 |
| WO | 2008/014798 | 2/2008 |

VACUUM CLEANER

This application is a continuation of International application No. PCT/EP2006/007542 filed on Jul. 29, 2006.

The present disclosure relates to the subject matter disclosed in International application No. PCT/EP2006/007542 of Jul. 29, 2006, which is incorporated herein by reference in its entirety and for all purposes.

BACKGROUND OF THE INVENTION

The invention relates to a vacuum cleaner with a dirt collection tank which has a suction inlet and is in flow connection with at least one suction unit via at least one filter and at least one extraction line, and with at least one external air inlet which opens into the extraction line downstream of the at least one filter and can be closed by means of at least one closing valve, wherein the at least one closing valve has a valve member which can be moved back and forth between a closing position, in which it abuts on a valve seat, and an open position, in which it is spaced from the valve seat, wherein it is acted upon by a spring-elastic restoring device with a closing force and in the closing position, in addition, by a magnetic holding device with a magnetic holding force.

Dirt and, preferably, also liquid can be sucked up by means of such vacuum cleaners in that the dirt collection tank is acted upon with a vacuum with the aid of at least one suction unit so that a suction flow is formed and dirt and liquid can be sucked into the dirt collection tank. The vacuum cleaners have one or more filters which are arranged in the flow path between the dirt collection tank and the at least one suction unit and serve to separate solids from the suction flow. During suction operation, dirt particles are increasingly deposited on the side of the at least one filter facing the dirt collection tank and so the filter or filters need to be cleaned after a certain length of time. For the purpose of cleaning, the side of the filter facing away from the dirt collection tank can be acted upon with external air in that at least one closing valve is opened so that external air can flow into the at least one extraction line from the external air inlet and act upon the side of the at least one filter facing away from the dirt collection tank.

A vacuum cleaner of the type specified at the outset is described in the German Utility Model DE 298 411 U1, wherein it is suggested that a suction hose, which is connected to the suction inlet of the dirt collection tank, be closed for a short time for the purpose of cleaning a filter so that a strong vacuum is formed in the dirt collection tank on account of the action of the suction unit. Subsequently, a closing valve is intended to be opened for a short time. The filter then has external air flowing through it in a counterflow direction, i.e., contrary to the direction of the suction flow prevailing during normal suction operation and so dirt particles adhering to the filter become detached.

The use of two filters, which are cleaned alternatingly, is suggested in DE 199 49 095 A1, wherein, during the cleaning of one filter, suction operation can be maintained via the other filter to a limited extent.

The object of the present invention is to develop a generic vacuum cleaner further in such a manner that it makes a particularly effective cleaning of the at least one filter possible.

SUMMARY OF THE INVENTION

This object is accomplished in accordance with the invention, in a vacuum cleaner of the type specified at the outset, in that the magnetic holding device has an electromagnet which can be acted upon with an exciting current for the purpose of closing the closing valve, wherein the electromagnet is connected to an electrical switching unit for the purpose of switching the exciting current on and off and that the valve member can be moved continuously back into the closing position via the open position, proceeding from the closing position, when the exciting current is interrupted, wherein the switch-off time of the exciting current is adapted to the movement time of the valve member.

The invention also includes the idea that an effective cleaning of the filter can be achieved in that the external air is supplied to the at least one filter in an impact-like manner within a short period of time so that the at least one filter is acted upon for a short time with a pressure surge. On account of the pressure surge, the at least one filter experiences a mechanical jarring and, in addition, the at least one filter has external air flowing through it in a counterflow direction so that an effective cleaning of the filter can be achieved. The supply of external air takes place during the opening movement of the valve member which is acted upon in the closing position with the magnetic holding force of the electromagnet. When the closing valve is closed, a vacuum is formed within the dirt collection tank and the extraction line, whereas, on the other hand, a higher pressure prevails on the side of the valve member facing away from the extraction line since, on this side, the valve member is acted upon with external air. Normally, atmospheric pressure prevails in this area. During normal suction operation, the valve member is, therefore, subject to a difference in pressure which is determined by the pressure of the external air and the vacuum prevailing in the extraction line. During normal suction operation, the closing valve is closed. For this purpose, the electromagnet is acted upon with the exciting current so that a magnetic field is formed which keeps the valve member in its closing position. If the exciting current of the electromagnet is interrupted, the valve member lifts away from an associated valve seat on account of the difference in pressure acting on it and performs an oscillation-like movement proceeding from its closing position into its open position and back into its closing position. The oscillation or movement time of the valve member, i.e., the duration of the movement of the valve member from its closing position via the open position back into the closing position is essentially predetermined by the spring constant of the spring-elastic restoring device. In accordance with the invention, the switch-off time of the exciting current is adapted to the movement time of the valve member. It may, for example, be provided for the exciting current to be interrupted at the most for such a time until the valve member which lifts away from the valve seat has been returned to the valve seat again by the spring-elastic restoring device, i.e., that the switch-off time of the exciting current corresponds at the most to the movement time of the valve member. The exciting current is supplied to the electromagnet again at the latest at the point in time, at which the valve member reaches the associated valve seat again so that the valve member is again held reliably on the valve seat and normal suction operation can be started again. It may also be provided for the exciting current to be switched on again when the valve member again carries out a movement in the direction towards the valve seat, i.e., that the switch-off time of the exciting current corresponds at least to half of and at the most to the entire movement time of the valve member. The movement of the valve member can then be aided by the influence of the magnetic field. The switch-off time of the exciting current can also be adapted to the movement time of the valve member in such a manner that the switch-off time is of an equal length to the movement time. With such a configuration, the valve member is again acted upon with a magnetic holding force when it reaches the valve seat.

It has been shown that as a result of coordination of the switch-off time of the exciting current with the movement time of the valve member a very short-time supply of external air to the at least one filter can be achieved. This has the advantage that a very short opening movement of the valve member can be achieved and so only a very limited amount of external air can flow into the dirt collection tank and the extraction line. This results, on the other hand, in the interruption in the suction operation scarcely being noticeable for the user; on the contrary, a more or less continuous suction operation can be achieved, wherein an effective cleaning of the filter is, nevertheless, brought about. The adaptation of the switch-off time of the exciting current to the movement time of the valve member makes it possible in a constructionally simple manner to clean all the existing filters of the vacuum cleaner at the same time in that the entire side of the at least one filter, which faces away from the dirt collection tank, is acted upon with external air. The external air is supplied to the filter in an impact-like manner, wherein the at least one suction unit is permanently in flow connection with the filter, also during the duration of its cleaning. During normal suction operation all the filters of the vacuum cleaner have suction air flowing through them at the same time so that during normal suction operation a large filter surface area is available for the deposition of dirt particles. The vacuum cleaner is therefore characterized by a large suction capacity.

The switch-off time of the exciting current is preferably approximately 0.02 seconds to approximately 2 seconds.

It is of particular advantage when the switch-off time of the exciting current is between 0.04 seconds and approximately 1 second. The switch-off time can, in particular, be approximately 0.08 seconds to approximately 0.12 seconds. It has been shown that a particularly effective cleaning of the filter can be achieved by way of such a short switch-off time.

The exciting current can preferably be switched off at time intervals of approximately 10 seconds to approximately 120 seconds, which means that a short-time cleaning of all the filters of the vacuum cleaner preferably takes place every 10 seconds to approximately every 120 seconds.

It is favorable when the exciting current can be switched off several times one after the other for approximately 0.05 seconds to approximately 0.15 seconds at uniform time intervals of approximately 10 seconds to approximately 60 seconds. This has the advantage that the at least one filter is acted upon with external air on its side facing away from the dirt collection tank several times one after the other for approximately 0.05 seconds to approximately 0.15 seconds following normal suction operation which lasts approximately 10 seconds to approximately 60 seconds. The time intervals between two consecutive actions with external air can be, for example, 0.3 seconds to 0.8 seconds, in particular, 0.4 to 0.6 seconds.

In order to ensure that the magnetic field breaks down within a very short period of time when the exciting current is interrupted and the valve member therefore lifts away from the valve seat on account of the difference in pressure acting on it, it is provided in one preferred development for at least one electrical component, which takes up at least part of the energy stored in the electromagnet when the current acting on the electromagnet ceases, to be connected in parallel to the electromagnet. The use of the component taking up the energy makes it possible for the magnetic field of the electromagnet to break down practically completely within approximately 10 milliseconds when the exciting current is interrupted. Consequently, the magnetic holding force for the valve member ceases practically instantly when the exciting current is interrupted and so the valve member lifts away from the valve seat within a few milliseconds and carries out a continuous movement into its closing position via its open position, proceeding from its closing position.

For example, a freewheeling diode and at least one component, which takes up energy and is connected in series thereto, in particular, a Zener diode which is polarized in an opposite direction to the freewheeling diode, can be connected in parallel to the electromagnet. The electromagnet builds up a considerable inductivity and so when the exciting current is interrupted a voltage is induced by way of self-inductance. In order to break down this voltage, at least one component which takes up energy is connected in parallel to the electromagnet; for example, a freewheeling diode can be used which short-circuits the electromagnet with respect to the induced voltage, i.e., the freewheeling diode is connected in a forward direction with respect to the induced voltage. In addition, a Zener diode can be arranged in series to the freewheeling diode and is connected in a reverse direction with respect to the induced voltage. As a result, the induced voltage experiences at the Zener diode a drop in voltage in the amount of its breakdown voltage. The breakdown voltage is preferably more than 50 volts, for example, 56 volts.

It is of advantage when the electromagnet is arranged on a filter holding device of the closing valve which forms the valve seat and when the valve member has a magnetizable element which is associated with the electromagnet and forms a magnetic circuit with the electromagnet in the closing position of the valve member. In the closing position of the valve member, the magnetizable element bundles the magnetic field lines of the electromagnet acted upon by current. If the valve member is, however, at a certain distance from the valve seat, the magnetic circuit between the electromagnet and the magnetizable element is interrupted. The magnetizable element can be of a plate-like design, for example, and it may be produced from an iron-bearing material. The use of the magnetizable element aids a movement of the valve member which is as short in time as possible since, on account of the use of the magnetizable element, the valve member is acted upon with the magnetic holding force only in direct vicinity of the electromagnet. In combination with the magnetizable element, the electromagnet forms a clamping magnet, to which the valve member adheres when it abuts on the electromagnet but the valve member will not already be attracted by the electromagnet while it is approaching it. As a result, the oscillation-like movement of the valve member is not noticeably influenced by the holding force of the electromagnet. The valve member may carry out an oscillation-like movement practically unaffected by magnetic influences, namely also when the exciting current has already been switched on again at a point in time, at which the valve member has not yet returned to the valve seat. The valve member approaching the valve seat is subject to the holding force of the electromagnet only at distances of less than approximately 2 millimeters.

The magnetic field of the electromagnet leads to a magnetization of the magnetizable element. If the magnetic field of the electromagnet is switched off as a result of interruption of the exciting current, magnetization remains in the magnetizable element and this results in a holding force directed onto the electromagnet. In order to keep the influence of the remaining magnetization, i.e., the residual magnetization of the valve member as small as possible, it is of advantage when, in the closing position of the valve member, the magnetizable element abuts on the end side of the electromagnet, thereby forming a gap of air. In principle, the residual magnetization of the valve member can, for example, be kept small by selecting a special alloy for the magnetizable element. This does, however, entail not inconsiderable costs. It has been shown that the influence of the residual magnetization of the magnetizable element can be kept very small by making a gap of air available between the magnetizable element and the electromagnet.

The width of the gap of air is preferably less than 1 millimeter; it may, for example, be approximately 0.5 millimeters.

No further details have so far been given regarding the design of the spring-elastic restoring device. It is favorable when the spring-elastic restoring device has a closing spring and, in addition, a stop spring, wherein the closing spring acts on the valve member with a closing force irrespective of its position relative to the valve seat and wherein the stop spring acts on the valve member with a restoring force only in a position spaced in relation to the valve seat. As a result of the stop spring being made available, a particularly short opening movement of the valve member can be achieved in a constructionally simple manner. Proceeding from its closing position, the valve member is subject first of all only to the closing force of the closing spring and so, when the magnetic holding force of the electromagnet ceases, the valve member can already lift away from the valve seat with a relatively low difference in pressure between the pressure of the external air and the vacuum prevailing in the extraction line. As a result, a reliable opening of the closing valve and, therefore, cleaning of the at least one filter can already be generated with the presence of a relatively small difference in pressure. Only when the valve member takes up a certain distance in relation to the valve seat will the stop spring be effective and act on the valve member with a repulsion force. The stop spring absorbs the movement energy of the valve member and accelerates it back in the direction of the valve seat. With the aid of the stop spring, the closing valve can be closed again within a very short period of time, in particular, after a period of time of less then 0.5 seconds, preferably less than 0.2 seconds.

The stop spring has, in one preferred design, a greater spring constant than the closing spring. The stop spring is, therefore, harder than the closing spring, i.e., a greater force is necessary to compress the stop spring than is the case for the closing spring. The stop spring can, like the closing spring, have a linear or also a non-linear characteristic; for example, it may be provided for the stop spring and/or the closing spring to become harder with increasing travel of the spring. The duration of the oscillation-like movement of the valve member can be influenced by way of selection of the spring constants of the closing spring and the stop spring. The greater the spring constant, the shorter the movement time of the valve member.

In one preferred embodiment of the vacuum cleaner according to the invention, the closing spring and the stop spring are designed as helical springs with different diameters, wherein one of the two helical springs surrounds the other helical spring in circumferential direction. This makes a space-saving arrangement of the closing spring and the stop spring possible and, in addition, makes a simple assembly possible.

The closing spring preferably surrounds the stop spring in circumferential direction. This has the advantage that the valve member is guided back into its closing position by a relatively large closing spring, i.e., the closing spring abuts on the valve member with a relatively large contact surface. The tilting stability of the valve member is improved as a result.

The vacuum cleaner can have several filters. It has proven to be particularly advantageous when the vacuum cleaner comprises a single filter. It may, in particular, be provided for the filter to be acted upon with external air over its entire surface area due to simultaneous opening of all the closing valves.

In a constructionally, particularly simple configuration of the vacuum cleaner according to the invention, this merely has a single closing valve which is positioned on the side of a filter holding device with flow passages which faces away from the single filter. As a result of the closing valve being opened, the single filter is acted upon with external air over its entire surface area.

Preferably, the at least one filter can be acted upon with external air by means of the at least one closing valve whilst a vacuum is maintained in the opening area of a suction hose opening into the suction inlet. If the at least one closing valve is opened, the pressure on the side of the filter facing away from the dirt collection tank rises abruptly and then drops again immediately. The abrupt rise in pressure causes an effective cleaning of the filter; since the rise in pressure does, however, drop again due to the at least one suction unit which is in flow connection with the filter even during the cleaning of the filter, the rise in pressure does not lead to a complete interruption in the vacuum in the opening area of the suction hose opening into the suction inlet. On the contrary, a more or less continuous suction operation can be maintained.

The following description of one preferred embodiment of the invention serves to explain the invention in greater detail in conjunction with the drawings.

DETAILED DESCRIPTION OF THE INVENTION

Figure 1:
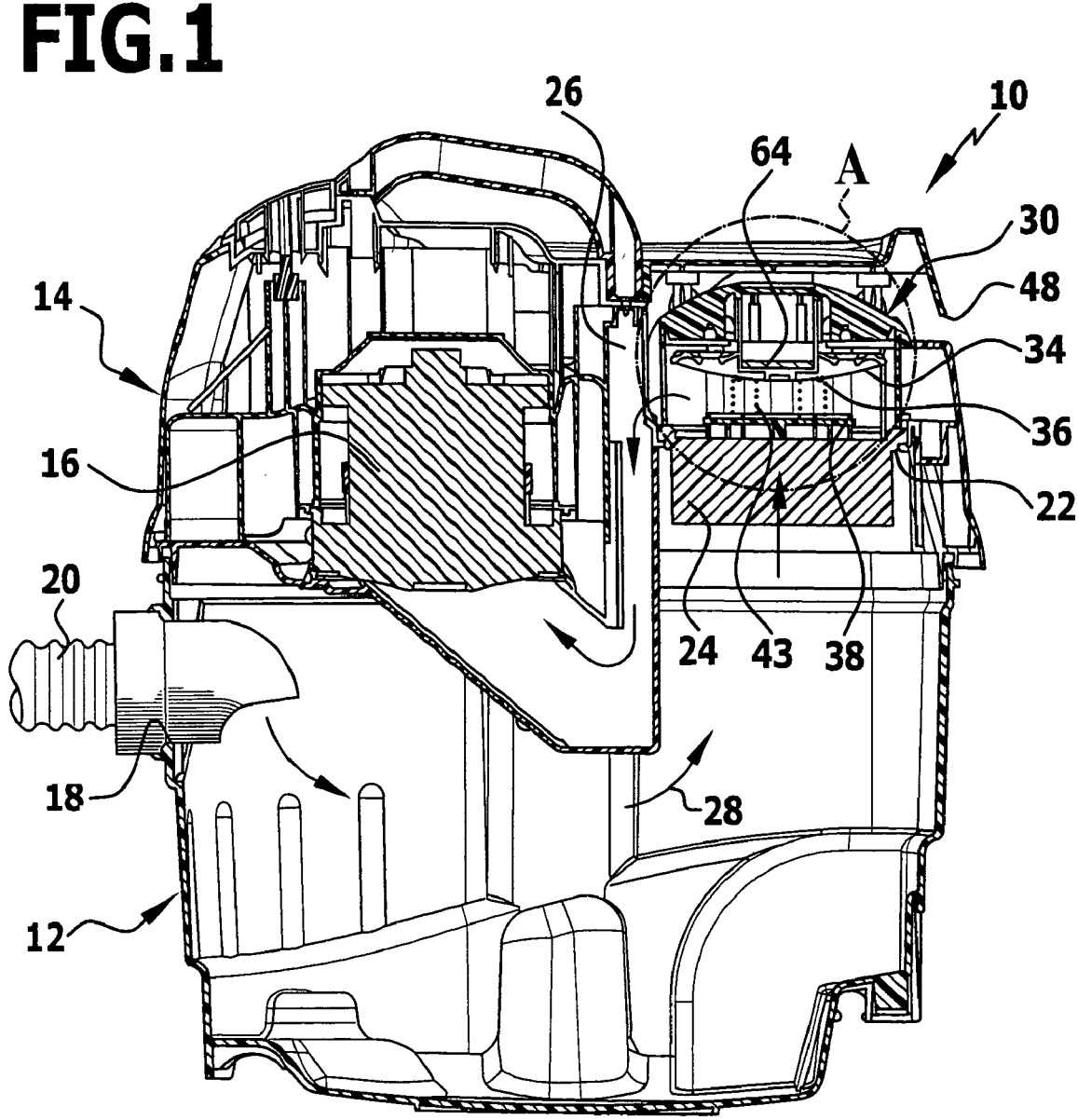
FIG. 1: shows a schematic sectional view of a vacuum cleaner according to the invention.

In the drawings, a vacuum cleaner 10 is illustrated schematically with a lower part which forms a dirt collection tank 12 and with an upper part 14 which is placed on the lower part and accommodates a suction unit 16. The dirt collection tank 12 comprises a suction inlet 18, to which a suction hose 20 can be connected. A suction nozzle can be connected to the free end of the suction hose 20 which is not illustrated in the drawings in order to achieve a better overview. Alternatively, it may be provided for the suction hose 20 to be connected to a machining tool, for example, a drilling unit or a milling unit so that dust which occurs during operation of the machining tool can be sucked in.

The upper part 14 forms a suction outlet 22 for the dirt collection tank 12. A folded filter 24 is held on the suction outlet 22 and an extraction line in the form of a suction channel 26 is connected to the filter. The folded filter 24 is permanently in flow connection with the suction unit 16 via the suction channel 26. The dirt collection tank 12 can be acted upon with a vacuum by the suction unit 16 via the suction channel 26 and the folded filter 24 and so a suction flow symbolized in FIG. 1 by the arrows 28 is formed, due to the action of which dirt can be sucked into the dirt collection tank 12. The dirt particles can be separated from the suction flow 28 by means of the folded filter 24.

Figure 2:
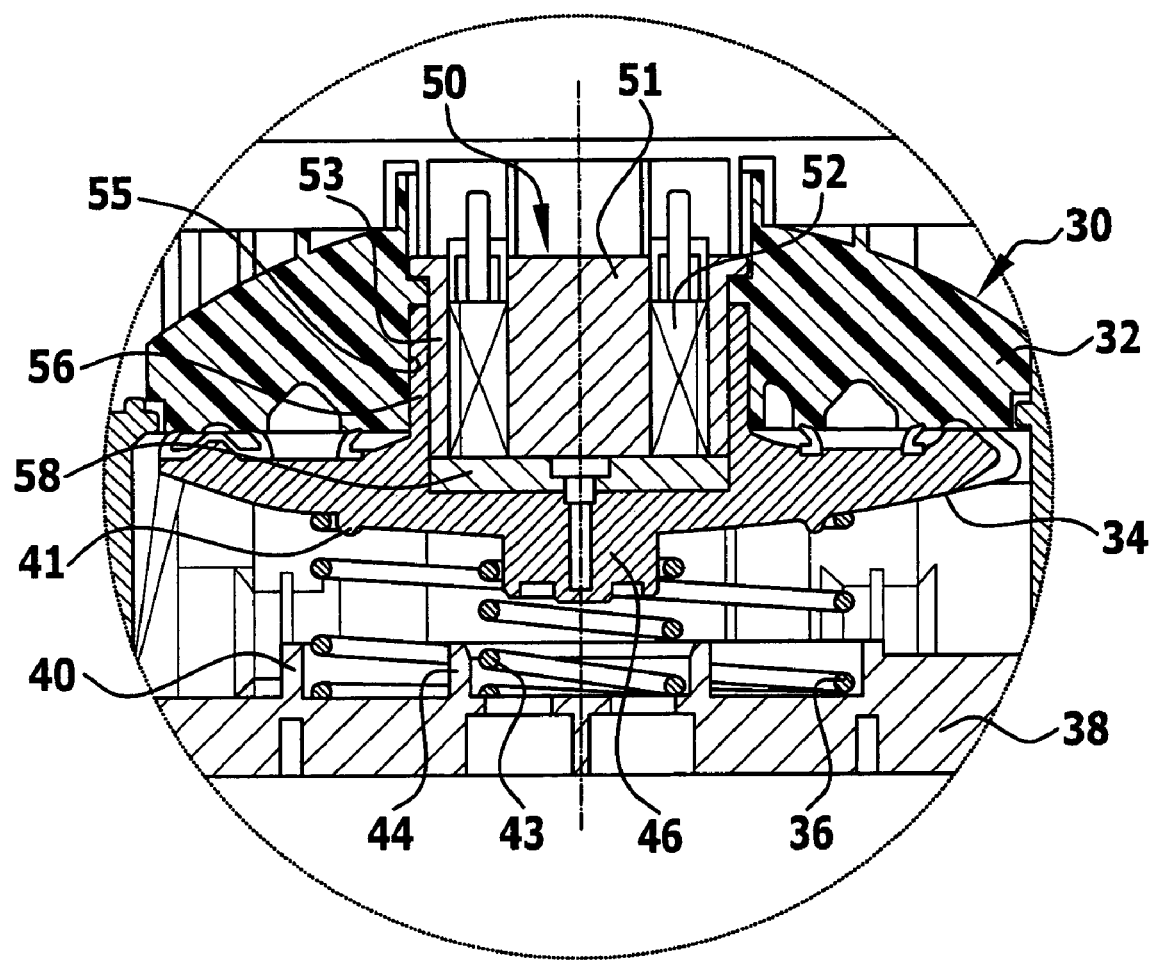
FIG. 2: shows an enlarged illustration of detail A from FIG. 1.

A closing valve 30 is arranged in the upper part 14 above the folded filter 24 and is illustrated in FIG. 2 on an enlarged scale. It comprises a valve holding device 32 which is arranged stationarily in the upper part 14, forms a valve seat and interacts with a valve member in the form of a circular valve plate 34. The valve plate 34 is acted upon with a closing force in the direction towards the valve holding device 32 by means of a closing spring 36. The closing spring 36 has a linear characteristic and is clamped between the valve plate 34 and a plate-like filter holding device 38 which has a plurality of flow passages and is arranged stationarily in the upper part 14. The filter holding device 38 has an outer annular collar 40, which surrounds the adjacent end area of the closing spring 36 designed as a helical spring in circumferential direction, on its upper side facing the closing valve 30. The valve plate 34 has an annular bead 41, on which the closing spring 36 abuts on the outer side, on its underside facing the filter holding device 38.

In addition to the closing spring 36, the filter holding device 38 has a resilient stop element in the form of a stop spring 43 which, like the closing spring 36, is designed as a helical spring and has a linear characteristic. In order to hold the stop spring 43, the filter holding device 38 comprises on its upper side facing the closing valve 30 an inner annular collar 44 which is arranged concentrically to the outer collar 40 and in which the stop spring 43 engages with an end section. A guiding pin 46 is integrally formed on the valve plate 34 on the under side, aligned with the inner annular collar 44, this guiding pin being surrounded by an end area of the stop spring 43 in the closing position of the valve plate 34 illustrated in FIG. 2. The stop spring 43 is not subject to tensioning in the closing position of the valve plate, in contrast to the closing spring. Only when the valve plate 34 has lifted away from the valve seat of the valve holding device 32 will the stop spring 43 abut on the underside of the valve plate 34 and will be compressed somewhat during further movement of the valve plate 34.

The valve holding device 32 has a plurality of openings which are not illustrated in the drawings and which open into the valve seat, on which the valve plate 34 sealingly abuts when it takes up its closing position. At the level of the valve holding device 32, the upper part 14 has a lateral opening 48. External air can flow into the openings in the valve holding device 32 via the lateral opening 48. If the valve plate 34 takes up a position which is spaced in relation to the valve holding device 32 and, therefore, also in relation to the valve seat, the lateral opening 48 is in flow connection with the suction channel 26 via the openings in the valve holding device 32 and external air can act on the side of the filter 24 facing away from the dirt collection tank 12. If the valve plate 34 takes up its closing position, the flow connection between the suction channel 26 and the lateral opening 48 is interrupted.

In a central area, the valve holding device 32 has a magnetic holding device in the form of an electromagnet 50 with a magnetic core 51 which is surrounded by a magnetic coil 52. The end of the electromagnet 50 on the outer side is formed by a cylindrical casing 53 which, like the magnetic core 51, is produced from a magnetizable material. The casing 53 is surrounded in the circumferential direction by a guiding receptacle in the form of an annular space 55, in which a guiding sleeve 56 engages which is integrally formed on the valve plate 34 on the upper side. The annular space 55 and the guiding sleeve 56 form guiding elements for the displaceable mounting of the valve plate 34. The guiding sleeve 56 accommodates a magnetizable element in the form of an iron plate 58 which abuts on the free end side of the electromagnet 50 in the closing position of the valve plate 34, thereby forming a narrow gap of air of approximately 0.5 millimeters in width, and forms a magnetic circuit in combination with the magnetic core 51 and the casing 53.

Figure 3:
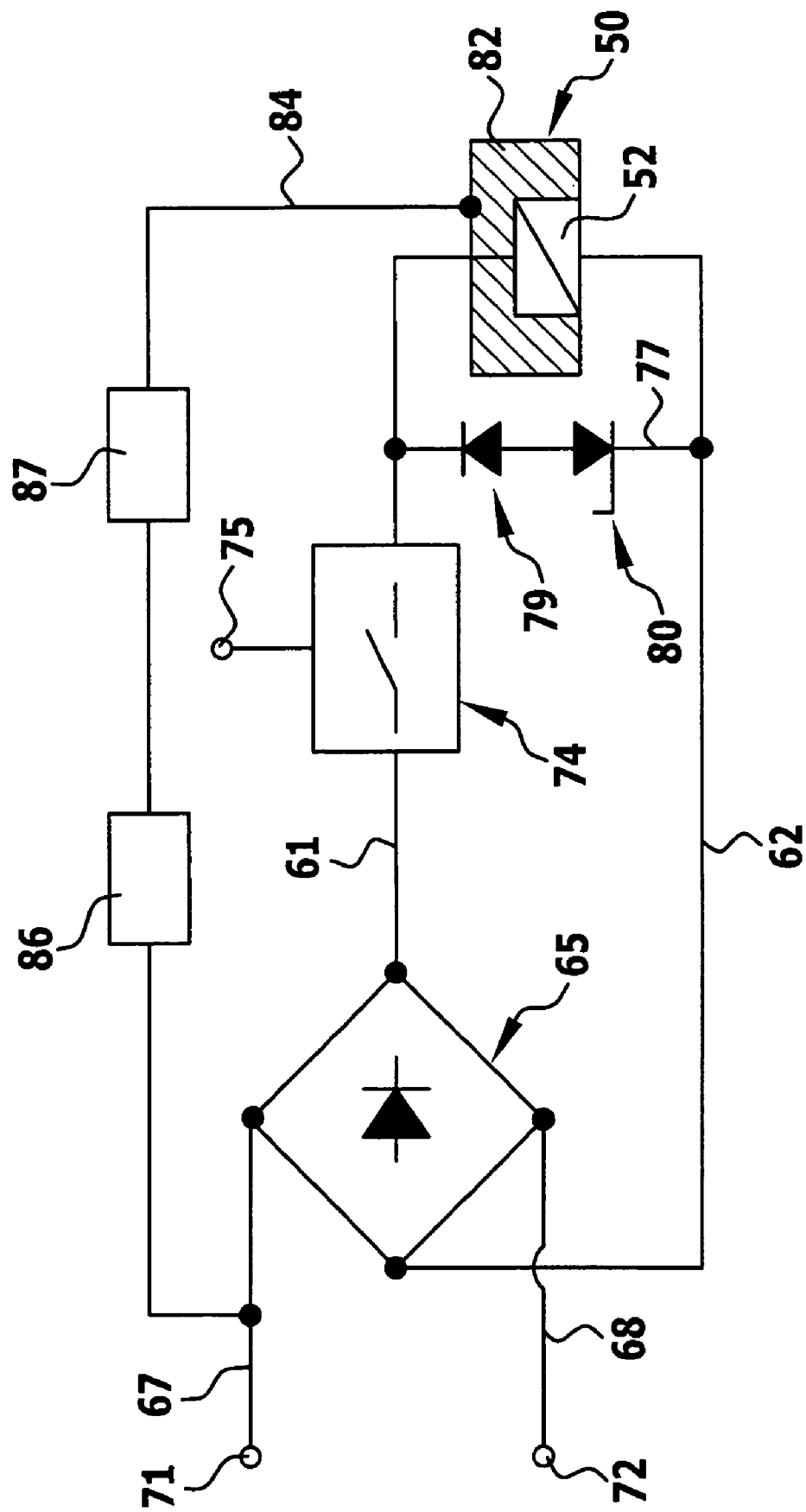
FIG. 3: shows a block diagram of a supply circuit for an electromagnet of the vacuum cleaner.

The supply of current to the electromagnet 50 is illustrated schematically in FIG. 3. The electromagnet 50 is connected to a rectifier unit 65 via a first current supply line 61 and a second current supply line 62, the rectifier unit being connected to voltage supply connections in the form of mains connections 71 and 72 via a first connection line 67 and a second connection line 68. A connection cable of the vacuum cleaner 10 can be connected in a customary manner to the mains connections 71 and 72, the connection cable connecting the mains connections 71, 72 to a source of AC voltage.

An electrical switching unit 74 is connected into the first current supply line 61 and has a control connection 75 which can be acted upon with a control signal by a control unit of the vacuum cleaner 10 which is not illustrated in the drawings.

The electromagnet 50 is bridged by a free-running line 77, into which a freewheeling diode 79 and a Zener diode 80 are connected in series to one another. The Zener diode 80 is polarized in an opposite direction to the freewheeling diode 79.

The magnetic core 51 and the casing 53 of the electromagnet 50 form a housing which is given the reference numeral 82 in FIG. 3. The housing is connected to the first connection line 67 via a potential equalization line 84, wherein a first ohmic resistor 86 and a second ohmic resistor 87 are connected in series to one another in the potential equalization line 84. Static charges of the housing 82 can be discharged to the first connection line 67 and, therefore, to the mains connection 71 via the potential equalization line 84. Such charges can be formed on account of dirt particles which flow past the housing 82 during operation of the vacuum cleaner 10. The two ohmic resistors 86 and 87 have different resistance values, for example, the first ohmic resistor 86 can have a resistance value of approximately 8 megaohms and the second ohmic resistor 87 can have a resistance value of approximately 12 megaohms.

Figure 4:
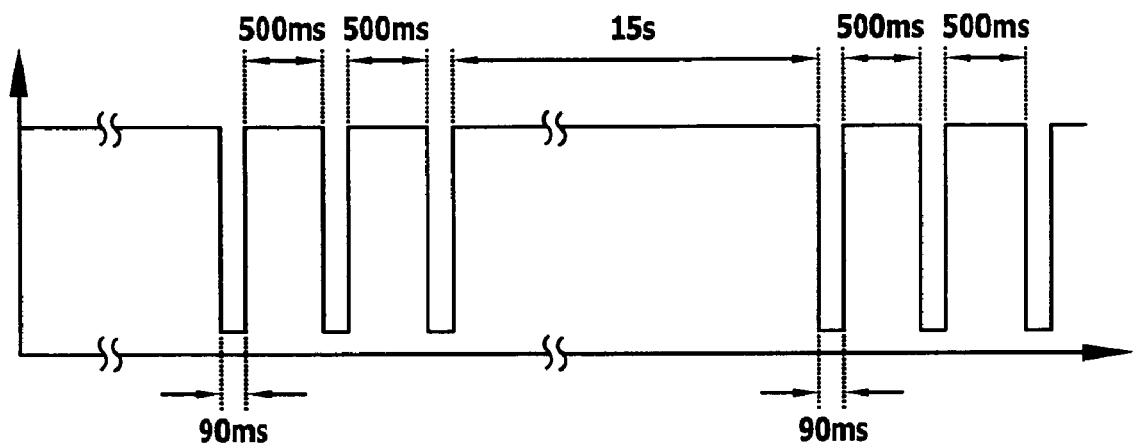
FIG. 4: shows a schematic illustration of the interruption of the exciting current of the electromagnet

During normal suction operation, the electromagnet 50 is acted upon with an exciting current via the first current supply line 61 and the second current supply line 62 so that a magnetic field is formed at the electromagnet 50 which exerts a magnetic holding force on the valve plate 34. The valve plate 34 is held sealingly on the valve seat of the valve holding device 32 due to the action of the magnetic holding force. The suction unit 16 acts on the dirt collection tank 12 and the suction channel 26 with a vacuum so that dirt particles, like liquid droplets, can be sucked into the dirt collection tank 12. Dirt particles are deposited on the filter 24 and so this gradually becomes clogged during normal suction operation. At time intervals of 15 seconds, the exciting current of the electromagnet 50 is, therefore, interrupted three times one after the other for 90 milliseconds each time, wherein the time intervals between the short-time current interruptions are 500 milliseconds. This is apparent from FIG. 4 which schematically illustrates the course of the exciting current in time.

The interruption of the exciting current results in the magnetic field of the electromagnet breaking down within a very short time, namely within less than 10 milliseconds and, therefore, the magnetic holding force for the valve plate 34 ceasing. This, on the other hand, causes the valve plate 34 to lift away from the valve seat contrary to the action of the closing spring 36 on account of the difference in pressure acting on it which results from the external pressure of the external air present in the area of the valve holding device 32, normally atmospheric pressure, and the internal pressure within the suction channel 26. External air can then flow into the suction channel 26 abruptly through the openings in the valve holding device 32 so that the filter 24 is acted upon in an impact-like manner with external air on its side facing away from the dirt collection tank 12. This leads to a mechanical jarring of the filter 24. In addition, the filter 24 has external air flowing through it in a counterflow direction. This results, altogether, in an effective cleaning of the filter 24.

Figure 5:
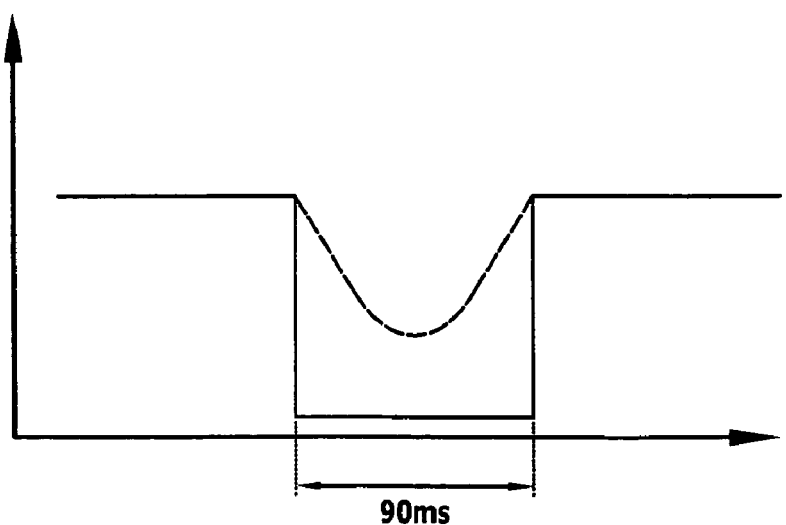
FIG. 5: shows an enlarged schematic illustration of the interruption of the exciting current.

The valve plate 34 lifting away from the valve seat abuts on the stop spring 43, which acts on the valve plate 34 with a repulsion force towards the valve holding device 32, with its underside after a short lifting movement. The stop spring 43 absorbs the movement energy of the valve plate 34 and therefore acts as a type of shock absorber for the valve plate 34. The latter is accelerated by the stop spring 43 in the direction towards the valve seat. The valve plate 34 therefore carries out a continuous movement back and forth, proceeding from the valve seat. In FIG. 5, the course of the movement of the valve plate 34 is illustrated by a dashed line and the exciting current is illustrated in FIG. 5 by a solid line. As is apparent from FIG. 5, the electromagnet 50 is acted upon with the exciting current again by the switching unit 74 only when the valve member 34 has again reached the valve seat. The switch-off time of the exciting current which, in the embodiment illustrated, is 90 milliseconds therefore corresponds to the movement time of the valve member, i.e., it corresponds to the time which the valve member requires to arrive back at its closing position via its open position in a continuous movement proceeding from its closing position. If the valve member 34 reaches the valve seat again, the electromagnet 50 is again acted upon with the exciting current; a magnetic field is again formed practically instantly and so the valve member 34 is again acted upon with the magnetic holding force and is, therefore, again held sealingly on the valve seat. It could also be provided for the exciting current to already be switched on again at an earlier point in time, for example, when the valve plate 34 is again moving in the direction towards the valve seat, i.e., the switch-off time could be between half of and the entire movement time of the valve plate 34.

During the opening movement of the valve plate 34, external air passes to the side of the filter 24 facing away from the dirt collection tank 12 and so the filter is cleaned. In order to achieve a particularly effective cleaning of the filter, the closing valve 30 is opened in a cleaning cycle three times one after the other at intervals of 500 milliseconds for 90 milliseconds each time and subsequently kept closed again for 15 seconds.

If the valve plate 34 abuts sealingly on the associated valve seat, a gap of air of approximately 0.5 millimeters is formed between the iron plate 58 and the electromagnet 50. This gap of air ensures that the residual magnetization of the iron plate 58 has no noticeable influence on the oscillation-like movement of the valve plate 34. The gap of air ensures in combination with the use of the freewheeling diode 79 and the Zener diode 80 that the valve plate 34 will be lifted away from the valve seat practically instantly with an interruption of the exciting current on account of the difference in pressure acting on it. The valve plate 34 can, therefore, carry out a very rapid opening movement. On account of the short opening of the closing valve 30, a vacuum is also maintained during the cleaning of the filter in the opening area of the suction hose 20 flowing into the suction inlet 18. As a result, a more or less continuous suction operation is possible for the user and, nevertheless, a reliable cleaning of the filter is guaranteed.

The invention claimed is:

1. Vacuum cleaner with a dirt collection tank having a suction inlet and being in flow connection with at least one suction unit via at least one filter and at least one extraction line, and with at least one external air inlet opening into the extraction line downstream of the at least one filter, said external air inlet being closable by means of at least one closing valve, wherein the at least one closing valve has a valve member movable back and forth between a closing position, said valve member abutting on a valve seat in said closing position, and an open position, said valve member being spaced from the valve seat in said open position, wherein said valve member is acted upon by a spring-elastic restoring device with a closing force and in the closing position, in addition, by a magnetic holding device with a magnetic holding force, wherein the magnetic holding device has an electromagnet adapted to be acted upon with an exciting current for the purpose of closing the closing valve, wherein the electromagnet is connected to an electrical switching unit for the purpose of switching the exciting current on and off, and wherein the valve member is movable continuously back into the closing position via the open position, proceeding from the closing position, when the exciting current is interrupted, wherein the switch-off time of the exciting current is adapted to the movement time of the valve member.

2. Vacuum cleaner as defined in claim 1, wherein the switch-off time of the exciting current is approximately 0.02 seconds to approximately 2 seconds.

3. Vacuum cleaner as defined in claim 1, wherein the switch-off time of the exciting current is between 0.04 seconds and 1 second.

4. Vacuum cleaner as defined in claim 1, wherein the exciting current is adapted to be switched off at time intervals of approximately 10 seconds to approximately 120 seconds.

5. Vacuum cleaner as defined in claim 4, wherein the exciting current is adapted to be switched off several times one after the other for approximately 0.05 seconds to approximately 0.15 seconds at uniform time intervals of approximately 10 seconds to approximately 60 seconds.

6. Vacuum cleaner as defined in claim 1, wherein at least one electrical component is connected in parallel to the electromagnet, said component taking up at least some of the energy stored in the electromagnet when the current acting on the electromagnet ceases.

7. Vacuum cleaner as defined in claim 1, wherein the electromagnet is arranged on a valve holding device forming the valve seat and wherein the valve member has a magnetizable element associated with the electromagnet, said element forming a magnetic circuit with the electromagnet in the closing position of the valve member.

8. Vacuum cleaner as defined in claim 7, wherein in the closing position of the valve member the magnetizable element abuts on the end side of the electromagnet, thereby forming a gap of air.

9. Vacuum cleaner as defined in claim 8, wherein the width of the gap of air is smaller than 1 millimeter.

10. Vacuum cleaner as defined in claim 1, wherein the spring-elastic restoring device has a closing spring and a stop spring, wherein the closing spring acts on the valve member with a closing force irrespective of its position relative to the valve seat and wherein the stop spring acts on the valve member with a repulsion force only in a position spaced in relation to the valve seat.

11. Vacuum cleaner as defined in claim 10, wherein the spring constant of the stop spring is greater than the spring constant of the closing spring.

12. Vacuum cleaner as defined in claim 10, wherein the closing spring and the stop spring are designed as helical springs with different diameters, wherein one of the two helical springs surrounds the other helical spring in circumferential direction.

13. Vacuum cleaner as defined in claim 1, wherein the vacuum cleaner has a single filter.

14. Vacuum cleaner as defined in claim 13, wherein the filter is adapted to be acted upon with external air over its entire surface area as a result of the closing valve being opened.

15. Vacuum cleaner as defined in claim 1, wherein the at least one filter is adapted to be acted upon with external air by means of the at least one closing valve whilst a vacuum is maintained in the opening area of a suction hose opening into the suction inlet.

* * * * *